(12) United States Patent
Brewer et al.

(10) Patent No.: US 8,577,404 B2
(45) Date of Patent: *Nov. 5, 2013

(54) PRIORITIZATION OF GROUP COMMUNICATIONS AT A WIRELESS COMMUNICATION DEVICE

(75) Inventors: Beth Ann Brewer, Canyonlake, TX (US); Ashutosh Aggarwal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 449 days.

This patent is subject to a terminal disclaimer.

(21) Appl. No.: 12/502,036

(22) Filed: Jul. 13, 2009

(65) Prior Publication Data

US 2010/0016008 A1    Jan. 21, 2010

Related U.S. Application Data

(60) Provisional application No. 61/080,970, filed on Jul. 15, 2008, provisional application No. 61/167,077, filed on Apr. 6, 2009, provisional application No. 61/162,976, filed on Mar. 24, 2009.

(51) Int. Cl.
*H04B 7/00* (2006.01)

(52) U.S. Cl.
USPC ........... 455/518; 455/519; 455/520; 455/90.2

(58) Field of Classification Search
USPC ........ 455/517–520, 553.1, 90.2, 78, 79, 500, 455/426.1, 412.1, 414.1, 416, 420; 370/352, 389, 338, 328
See application file for complete search history.

(56) References Cited

U.S. PATENT DOCUMENTS

| | | | |
|---|---|---|---|
| 4,771,422 A * | 9/1988 | Hauer | 370/359 |
| 4,771,442 A * | 9/1988 | Waddington | 375/360 |
| 5,521,925 A | 5/1996 | Merakos et al. | |
| 6,067,457 A | 5/2000 | Erickson et al. | |

(Continued)

FOREIGN PATENT DOCUMENTS

| | | |
|---|---|---|
| CN | 1832414 A | 9/2006 |
| EP | 1193993 A2 | 4/2002 |

(Continued)

OTHER PUBLICATIONS

International Search Report, PCT/US2009/050744, International Searching Authority, European Patent Office, Dec. 11, 2009.

(Continued)

*Primary Examiner* — Dominic E Rego
(74) *Attorney, Agent, or Firm* — Raphael Freiwirth

(57) ABSTRACT

An embodiment is directed to switching between server-arbitrated group communication sessions at an access terminal (AT) within a wireless communications system. The AT participates in a first group communication session when it receives an announce message announcing a second group communication session, acquires priority levels for the first and/or second group communication sessions and determines whether to switch between sessions based on the priority level(s). In another embodiment, the AT participates in a given processing task (e.g., a gaming session, a voice call, a group session, etc.) when it receives an alert that relates to a group communication session. If the alert is specially configured to force the given access terminal to drop the given processing task, the AT drops the given processing task irrespective of whether the AT later joins the announced group communication session.

26 Claims, 4 Drawing Sheets

(56) References Cited

U.S. PATENT DOCUMENTS

| | | | |
|---|---|---|---|
| 6,167,252 A | 12/2000 | Cohen | |
| 6,243,580 B1 | 6/2001 | Garner | |
| 6,275,575 B1 | 8/2001 | Wu | |
| 6,636,482 B2 | 10/2003 | Cloonan et al. | |
| 6,674,713 B1* | 1/2004 | Berg et al. | 370/217 |
| 6,721,831 B1 | 4/2004 | Lee | |
| 6,725,052 B1* | 4/2004 | Raith | 455/518 |
| 6,744,732 B1 | 6/2004 | Pfenning et al. | |
| 6,781,963 B2 | 8/2004 | Crockett et al. | |
| 6,970,926 B1 | 11/2005 | Needham et al. | |
| 7,089,016 B2 | 8/2006 | Dokko | |
| 7,093,044 B2 | 8/2006 | Joy et al. | |
| 7,397,774 B1 | 7/2008 | Holland et al. | |
| 7,545,780 B2* | 6/2009 | Chitrapu | 370/338 |
| 7,761,110 B2* | 7/2010 | Chotai et al. | 455/519 |
| 7,761,515 B2* | 7/2010 | Denninghoff | 709/205 |
| 7,848,642 B1* | 12/2010 | Chaudhuri et al. | 398/5 |
| 8,094,618 B2 | 1/2012 | Yi et al. | |
| 2004/0005904 A1* | 1/2004 | Wolf et al. | 455/519 |
| 2004/0058695 A1 | 3/2004 | Ji et al. | |
| 2004/0077358 A1 | 4/2004 | Bennett et al. | |
| 2004/0125800 A1 | 7/2004 | Zellner | |
| 2004/0142694 A1 | 7/2004 | Levy et al. | |
| 2004/0202178 A1* | 10/2004 | Okubo | 370/395.1 |
| 2005/0124365 A1 | 6/2005 | Balasuriya et al. | |
| 2006/0120321 A1 | 6/2006 | Gerkis et al. | |
| 2006/0276213 A1* | 12/2006 | Gottschalk et al. | 455/518 |
| 2007/0004438 A1 | 1/2007 | Brusilovsky et al. | |
| 2007/0195762 A1 | 8/2007 | Choi et al. | |
| 2007/0197248 A1* | 8/2007 | Reich et al. | 455/518 |
| 2007/0197249 A1 | 8/2007 | Ross et al. | |
| 2007/0202910 A1 | 8/2007 | Brewer et al. | |
| 2007/0239824 A1 | 10/2007 | Shaffer et al. | |
| 2007/0281723 A1 | 12/2007 | Chotai et al. | |
| 2008/0003942 A1* | 1/2008 | Namm et al. | 455/11.1 |
| 2008/0076391 A1* | 3/2008 | Chen et al. | 455/411 |
| 2008/0081567 A1* | 4/2008 | Rofougaran | 455/78 |
| 2008/0146203 A1* | 6/2008 | Khawand et al. | 455/414.1 |
| 2008/0175189 A1* | 7/2008 | Furrer et al. | 370/328 |
| 2009/0061904 A1 | 3/2009 | Emrich et al. | |
| 2009/0080360 A1 | 3/2009 | Song | |
| 2009/0312045 A1* | 12/2009 | Miller et al. | 455/519 |
| 2010/0016008 A1* | 1/2010 | Brewer et al. | 455/518 |
| 2010/0020958 A1* | 1/2010 | Roberts et al. | 379/215.01 |
| 2010/0074222 A1 | 3/2010 | Wu | |
| 2010/0248771 A1 | 9/2010 | Brewer et al. | |
| 2010/0255826 A1 | 10/2010 | Brewer et al. | |
| 2011/0026419 A1 | 2/2011 | Kim et al. | |

FOREIGN PATENT DOCUMENTS

| | | | |
|---|---|---|---|
| EP | 1681896 A1 | 7/2006 | |
| EP | 1871139 A1 | 12/2007 | |
| JP | 3050996 A | 3/1991 | |
| JP | 6334587 A | 12/1994 | |
| JP | 8508373 | 9/1996 | |
| JP | 11504782 T | 4/1999 | |
| JP | 2000350256 A | 12/2000 | |
| JP | 2001103551 A | 4/2001 | |
| JP | 2003086233 A | 3/2003 | |
| JP | 2003209885 A | 7/2003 | |
| JP | 2003298751 A | 10/2003 | |
| JP | 2006515135 A | 5/2006 | |
| JP | 2007505563 A | 3/2007 | |
| JP | 2009302605 A | 12/2009 | |
| WO | 9732443 A2 | 9/1997 | |
| WO | 0145330 A1 | 6/2001 | |
| WO | 0230010 | 4/2002 | |
| WO | 03036801 A2 | 5/2003 | |
| WO | 2004075001 A2 | 9/2004 | |
| WO | 2005027483 A1 | 3/2005 | |
| WO | 2005096658 A1 | 10/2005 | |
| WO | 2005112488 | 11/2005 | |
| WO | WO2006129985 A1 | 12/2006 | |
| WO | 2007098331 | 8/2007 | |
| WO | WO2008048273 A2 | 4/2008 | |
| WO | WO2008091893 A1 | 7/2008 | |

OTHER PUBLICATIONS

Written Opinion, PCT/US2009/050744, International Searching Authority, European Patent Office, Dec. 11, 2009.
European Search Report—EP11175647—Search Authority—Munich—Aug. 31, 2011.
Open Mobile Alliance (OMA) Ltd: "Push to Talk Over Cellular (PoC)-Architecture Draft Version 2.0", Open Mobile Alliance OMA-AD_PoC-V2_0-20060224-D, Feb. 24, 2006, pp. 1-218, XP-002462873.

* cited by examiner

US 8,577,404 B2

PRIORITIZATION OF GROUP COMMUNICATIONS AT A WIRELESS COMMUNICATION DEVICE

CLAIM OF PRIORITY UNDER 35 U.S.C. §119

The present Application for Patent claims priority to Provisional Application No. 61/080,970 entitled "PRIORITIZATION OF GROUP COMMUNICATIONS AT A WIRELESS COMMUNICATION DEVICE" filed on Jul. 15, 2008, Provisional Application No. 61/167,077 entitled "EMERGENCY COMMUNICATION SESSIONS WITHIN A WIRELESS COMMUNICATIONS SYSTEM" filed on Apr. 6, 2009, and Provisional Application No. 61/162,976 entitled "SYSTEM AND METHOD FOR ALLOCATING TRAFFIC CHANNEL RESOURCES FOR COMMUNICATIONS FROM MOBILE DEVICES" filed on Mar. 24, 2009, each of which is incorporated herein by reference in its entirety.

BACKGROUND OF THE INVENTION

1. Field of the Invention

Embodiments of the invention are directed to prioritization of group communication sessions at a wireless communications device within a wireless communications system.

2. Description of the Related Art

There exists a wireless telecommunication service that provides a quick one-to-one or one-to-many communication between groups of wireless communication devices, such as mobile telephones, that is generically referred to as "Push-To-Talk" (PTT) capability. The specific PTT group of recipient devices for the communicating wireless device is commonly set up by the carrier. A PTT communication connection is typically initiated by a single button-push on the wireless device that activates a half-duplex communication between the speaker and each member device of the group and once the button is released, the device can receive incoming PTT transmissions. In some arrangements, the PTT speaker will have the "floor" where no other group member can speak while the speaker is speaking. Once the speaker releases the PTT button, any other individual member of the group can engage their PTT button and they will have the floor. The PTT speaker with the floor will control the floor unless the speaker is dropped to allow another speaker, or the speaker relinquishes control of the floor.

In some instances, it may be necessary or desirable to force the speaker off the floor. This may be necessary to allow emergency messages to be received at the wireless communication device without regard to the current PTT speaker. For example, in a fire, the fire chief's instructions to the fire brigade may be determined to be the most important item to receive in the group. Therefore, in some extant PTT systems, when the fire chief attempts to send a PTT communication, the group communication server servicing the group may drop the communication of any other group speakers and connect the fire chief with the group.

Another example may be an application that needs to be received by the wireless communication device that takes priority of the data channel over any other application being transmitted over the data channel. For example, the application may be a security patch that needs to be received and installed on the wireless communication device at that moment. Thus, when the application is pushed to the wireless device, it may be necessary to drop any current data communication and allow the security patch communication to occur.

Currently, there are various methods in which a speaker may be forced to relinquish the floor or a communication priority forced as between competing applications. For example, on a communication server servicing the communication group, the server may be provided with "ruthless preemption" capabilities. When a communication is received at the group communication server, the server can determine priority of the communication and remove the speaker from the floor of one or more of the communication devices in a communication group that are "listening", or receiving communications from, the speaker. However, this prioritization schema is difficult to change and requires modifications to the group communication server that is arbitrating the group session and enforcing the priority rules for each participating group member.

SUMMARY

An embodiment is directed to switching between server-arbitrated group communication sessions at an access terminal (AT) within a wireless communications system. The AT participates in a first group communication session when it receives an announce message announcing a second group communication session, acquires priority levels for the first and/or second group communication sessions and determines whether to switch between sessions based on the priority level(s). In another embodiment, the AT participates in a given processing task (e.g., a gaming session, a voice call, a group session, etc.) when it receives an alert that relates to a group communication session. If the alert is specially configured to force the given access terminal to drop the given processing task, the AT drops the given processing task irrespective of whether the AT later joins the announced group communication session.

DETAILED DESCRIPTION

Figure 1:
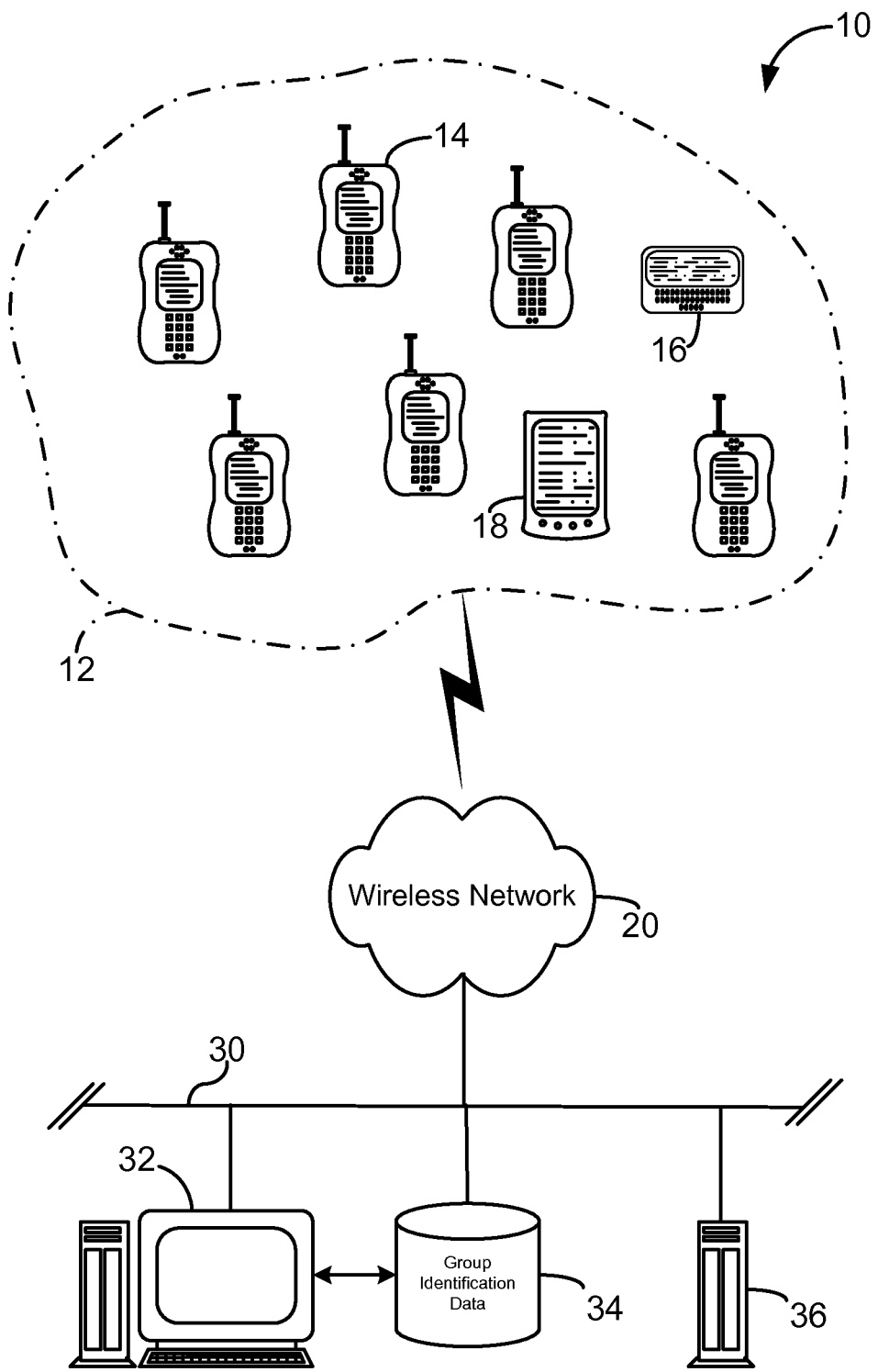
FIG. 1 is a representative diagram of one embodiment of a wireless network with a designated PTT group of wireless telecommunication devices communicating with a group communication server and other computer devices across the wireless network

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

In this description, the terms "communication device," "wireless device," "wireless communications device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

Furthermore, embodiments described below are directed to an implementation within a CDMA2000 network architecture. Reference can be had to the known standards and construction of CDMA2000 systems and network interfaces as would be known to one of skill in the art. Other telecommunication standards, such as CDMA2000 Evolution Data-Optimized (EvDO), IMT-2000, GSM, W-CDMA, etc., can likewise be used in implementations embodiments disclosed herein.

With reference to the figures in which like numerals represent like elements throughout, FIG. 1 illustrates one embodiment of a system 10 with a group communication server 32 and one or more wireless telecommunication devices in a communication group 12, such as wireless telephone 14, smart pager 16, and personal digital assistant (PDA) 18, that communicate with other wireless telecommunication devices across a wireless network 20. In the system 10, each wireless telecommunication device 14, 16, 18 is capable of selectively and directly communicating across the wireless communication network 20 with a target set of one or more other wireless telecommunication devices. For example, the target set for mobile telephone 14 can be all devices in the communication group 12 or a subset thereof, such as pager 16 and/or PDA 18.

In this embodiment, the wireless telecommunication device (such as mobile telephone 14) notifies the group communication computer device, shown here as group communication server 32, which is present on a server-side LAN 30 across the wireless network 20, to indicate that the wireless device is present, i.e. accessible, on the wireless network 20. The group communication computer device 32 can share this information with the set of target wireless telecommunication devices designated by the first wireless telecommunication device, or can also share the information with other computer devices resident on the server-side LAN 30 or accessible across the wireless network 20. The group communication computer device 32 can have an attached or accessible database 34 to store the group identification data for the wireless devices.

In an example, a direct communication, such as a PTT communication, can be established through a half-duplex channel between the communicating wireless telecommunication device 14, 16, 18 and the one or more other wireless telecommunication devices of the target set of devices. While embodiments of the invention are described as generally being directed to half-duplex communication sessions, it will be readily apparent that other embodiments can be directed to any server-arbitrated communication session, including full-duplex communication sessions (e.g., VoIP, etc.). Also, the group communication computer device 32 can attempt to bridge the requested direct communication with the target set if at least one of the wireless telecommunication devices of the target set have informed the group communication computer device 32 of their presence on the wireless network 20.

The group communication computer device 32 can also inform the wireless telecommunication device 14, 16, 18 of the inability to bridge a direct communication to the target set 12 if one or more of the wireless telecommunication devices of the target set have not informed the group communication computer device 32 of their presence on the wireless network 20. Further, while the group communication computer device 32 is shown here as having the attached database 34 of group identification data, the group communication computer device 32 can have group identity data resident thereupon, and perform all storage functions described herein. Also shown here is a secondary data storage 36 that can be accessed either by group member devices or server-side components such that applications and larger segments of data can be stored thereat, rather than being immediately sent between computer devices.

The group communication can be voice, applications, graphic media, such as pictures in JPEG, TIF, and the like, or audio files such as MP3, MP4, WAV, and the like. The media can also be video or streaming media, such as a multimedia application (PowerPoint, MOV file, and the like). Also, in an example, the group communication session can correspond to a half-duplex audio conference among members of the communication group 12. As will be appreciated, in this type of group communication session, the speed of the connection and the quality of media delivery (e.g., voice data) are important to maintain Quality of Service (QoS) to the end-user(s).

Figure 2:
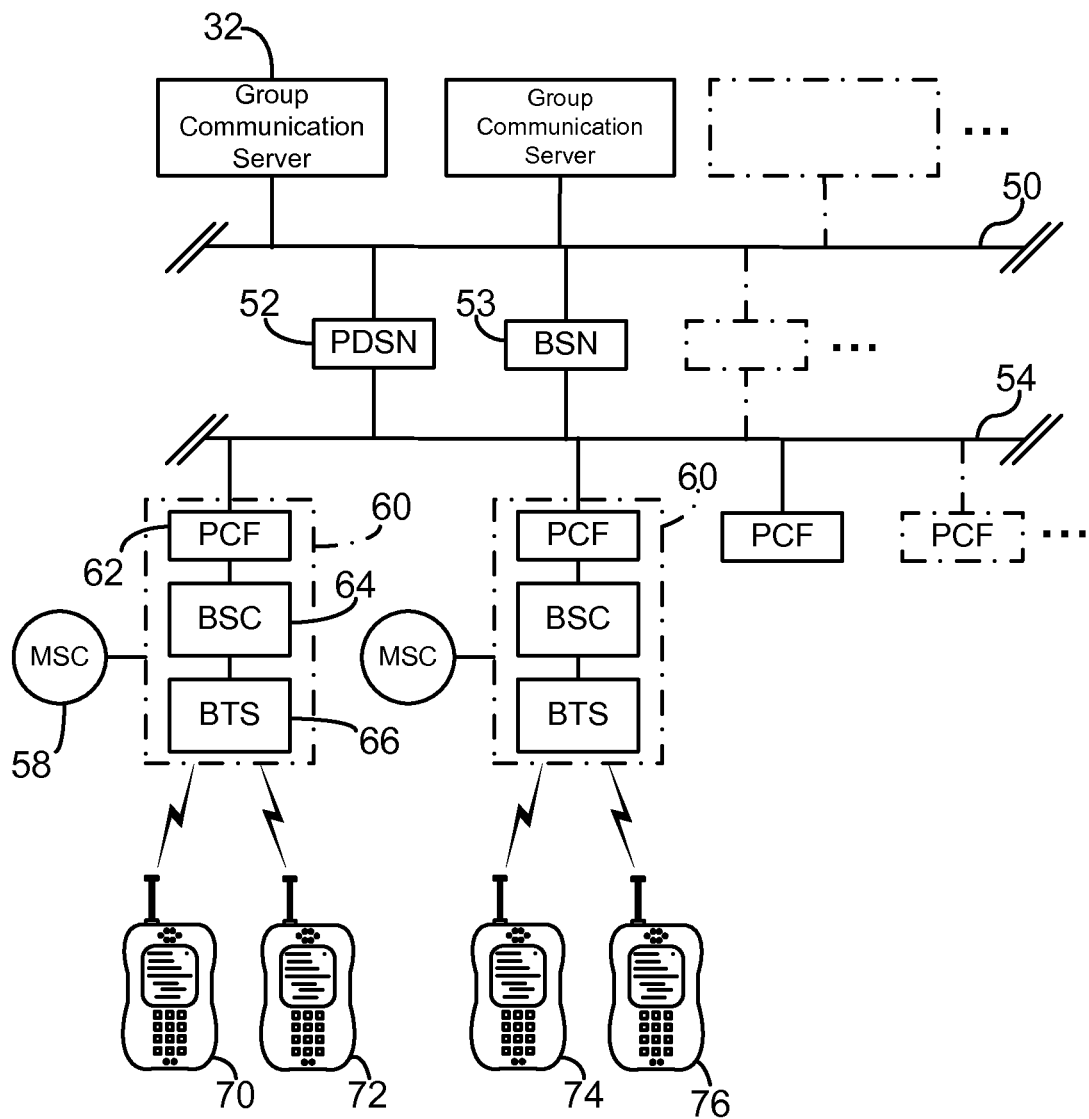
FIG. 2 is a representative diagram of one embodiment of a wireless network in a common cellular telecommunication configuration, having a group communication server control communications between the wireless telecommunication devices of PTT group members.

FIG. 2 is a representative diagram of one embodiment of a wireless network in a common cellular telecommunication configuration, having a series of group communication computer devices, such as group communication server 32 that controls communications between the wireless communication devices of set group members (devices 70, 72, 74, 76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless telephones can request packet data sessions from the group communication server(s) 32 using a data service option.

The group communication server 32 is connected to a wireless service provider's packet data service node (PDSN), such as PDSN 52, and/or a broadcast serving node (BSN) 53 shown here resident as on a carrier network 54. The PDSN 52 and BSN 53 with the associated base stations 60 can constitute a regional communication system (e.g., an access network or radio access network), and may further include other server side 50 components, that will collectively control communications to the wireless communication devices 70,72, 74,76 for a geographical or virtual region. Each PDSN 52 or BSN 53 can interface with a base station controller 64 of a base station 60 through a packet control function (PCF) 62. The PCF 62 is typically located in the base station 60. The carrier network 54 controls messages (generally in the form of data packets) sent to a mobile switching center ("MSC") 58. The carrier network 54 communicates with the MSC 58 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the base transceiver station (sometimes referred to as "branch-to-source") (BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art. It should also be noted that carrier boundaries and/or PTT operator network boundaries do not inhibit or prohibit the sharing of data as described herein.

Cellular telephones and mobile telecommunication devices, such as wireless telephone 14, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 14, can download many types of applications, such as web pages, applets, MIDlets, games and data. In wireless devices that have designated a communication group 12 (FIG. 1), the wireless communication device can directly connect with the other member of the set and engage in voice and data communication session. However, all such group-direct communication sessions may be 'server-arbitrated', which means that the communication sessions occur through, or be at the control of, the group communication server 32. Each data packet of the devices does not necessarily have to travel through the group communication server 32 itself, but the group communication server 32 may be able to ultimately control the communication session because the group communication server 32 will typically be the only server-side 30 component that is aware of and/or can retrieve the identity of the members of the communication group, or direct the identity of the members of the communication group 12 to another computer device.

Figure 3:
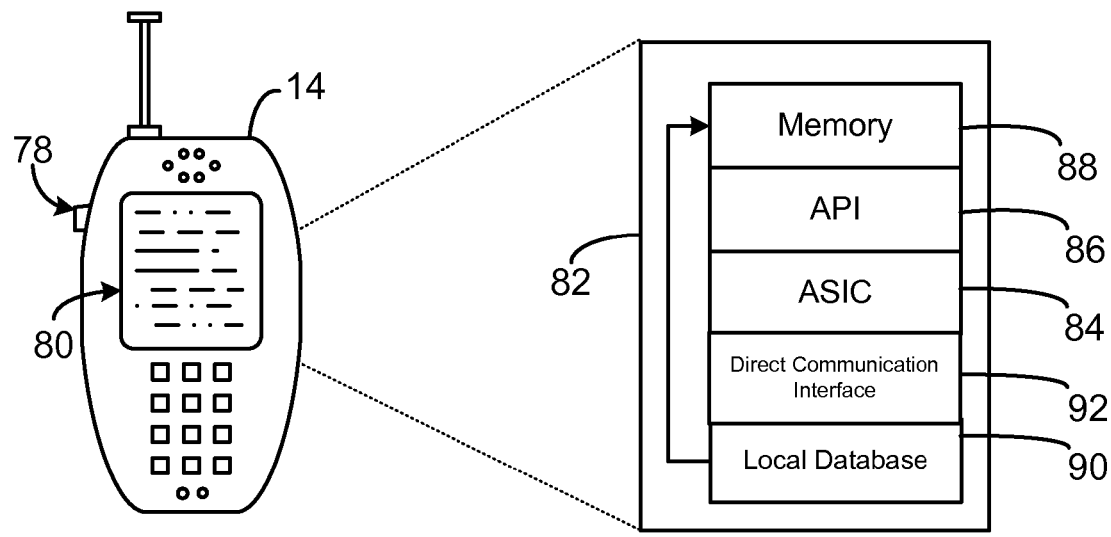
FIG. 3 is a block diagram illustrating the computer platform of the wireless communication device embodied with PTT capability.

As discussed previously, because PTT communication is facilitated using half duplex communication, when one wireless device, such as cellular telephone 14, has the floor, the other wireless devices in the group are "listening." FIG. 3 is a block diagram illustrating a wireless telecommunications device 14 (e.g., a mobile telephone) according to an embodiment of the invention. Referring to FIG. 3, the wireless telecommunications device 14 includes a PTT button 78 that is configured to open a direct communication to a target set of devices (e.g., other members of the communication group 12). The wireless device 14 is also shown as having a graphics display 80 to the user of the wireless device 14. The wireless device 14 includes a computer platform 82 that can handle voice and data packets, and receive and execute software applications transmitted across the wireless network 20 to include the group communications.

The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless device and may not normally be upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by QUALCOMM® for wireless device platforms.

As shown here, while the wireless device 14 can be a mobile telephone with a graphics display 80, in alternative embodiments the wireless device can correspond to any type of wireless device with a computer platform 82 as known in the art, such as a personal digital assistant (PDA), a pager with a graphics display 26, or even a separate computer platform that has a wireless communication portal, and may otherwise have a wired connection to a network or the Internet. Further, the memory 88 can include read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk. Here, the priority list as described herein is preferably stored in the local database 90 prior to being moved into memory 88.

In an embodiment of the wireless communication device 14 of FIG. 3, the computer platform 82 also includes a direct communication interface 92 that can open the direct communication channel from the wireless device (e.g., for a half-duplex voice communication in a PTT call). The direct communication interface 92 may also be part of the standard communication interface for the wireless device which ordinarily carries the voice and data transmitted to and from the wireless device. The direct communication interface 92 typically includes hardware as is known in the art.

As will be described in more detail below, at least one embodiment of the invention is directed to a handset-enforced priority handling for group communication sessions, whereby the mobile telephone 14 can selectively drop a lower priority communication for a higher priority communication. The memory 88 of the mobile telephone 14 stores a local priority list. In an example, the local priority list can include priorities associated with group communication sessions (e.g., group-priority levels, priority levels associated with particular calling parties, etc.), and these priorities can be user-defined and/or server-defined. The priority list is a listing, in some embodiments, from higher priority to lower priority, of the relative priority of communications. In an example, the priority list may include the identity of one or more calling party identifiers, communication devices and/or group identifiers that, when a request for communication, or an announcement or other similar type communication (e.g., an alert), is received, the wireless communication device 14 can evaluate the associated priority levels of the current call and the announced call to determine whether to selectively drop the current call and send a notice to communication server 32 that it is available.

An alert, as used in this context, is any communication received at a wireless communication device requesting the status of the device for receiving a group communication. The status may include a dormant (off) state, active (on) state, busy (unavailable), or ready (available). The alert may be received in various ways at wireless communication device 14. For example, while the voice channel is being used for PTT communications, e.g. the "1X" channel of some PTT communication networks, the data channel (such as an EvDO channel of some PTT communication networks) may be available. Thus, even if the voice channel is unavailable, due to the half duplex nature of the communication, wireless communication device 14 may still receive the alert over the data channel.

The communications affected or controlled by the priority list may vary, but may include voice, applications, graphic media, such as pictures in JPEG, TIF, and the like, or audio files such as MP3, MP4, WAV, and the like. Further, the contents of the priority list may vary from one single communication, may include multiple communications of the same priority, or may include multiple communications of varying priority. For example, memory 88 may have stored thereon a priority list of a single mobile device which is the mobile device for the captain of a fire department. The communication group, of which mobile telephone 14 is a part of, are mobile devices used by the fire department in emergency situations. For example, to facilitate directives of the captain of the fire department, when mobile telephone 14 receives an alert or other similar type communication from the mobile device of the captain, e.g. the captain wishes to take the floor, mobile telephone drops the current communication, sends a notice to communication server 32 that it is available for a call and awaits the communication from the captain. The priority list stored in memory 88 may be modified, as needed or allowed. For example, a parent may wish to indicate that they are the top priority communication for a child's mobile device but not allow the child to change the priority. Thus, the priority list stored in memory 88 may be password protected or controlled from a central location or by an administrative user.

Additionally, the priority list can be dynamically updated based upon other actions or conditions of the wireless communication device 14. For example, the incoming communication can be allowed if it is attempted from the same communicating device more than a predetermined number of times in a predetermined period, e.g. more than three communication attempts over 20 seconds. Another example is that the priority list can change if the wireless communication device 14 has the ability to determine its location, through a resident GPS or other location detection mechanism. Thus, in such embodiment, a greater priority can be given to a communicating device or communication that may have more importance given the location of the device, e.g. changing the priority of emergency personnel communications when the wireless communication device 14 is at a stadium or other event location. As the wireless communication device 14 can be configured to have the priority list pushed out to the computer platform 82, the dynamic modification of the priority list can be accomplished through either user interaction or from other computer devices on the wireless network 20, such as the group communication server 32. For example, the group communication server 32 learns that a wireless communication device 14 is at a stadium and pushes an updated priority list to the wireless communication device 14 giving priority to stadium emergency personnel.

Additionally, the priority list may be stored in memory 88 using various methods. For example, the priority list may be added to memory 88 locally, i.e. a person or user accesses a program which initializes an API from API layer 86. A graphical input interface may be shown on graphics display 80. A user may then enter, using keyboard of mobile telephone 14. The priority list may also be pushed to the mobile device remotely. For example, a program on a computing platform provides an interface that allows a user to configure the priority list of mobile telephone 14. Once the list is completed, it may be pushed to mobile telephone 14 via various communication means, including a data channel such as an EvDO channel.

Figure 4:
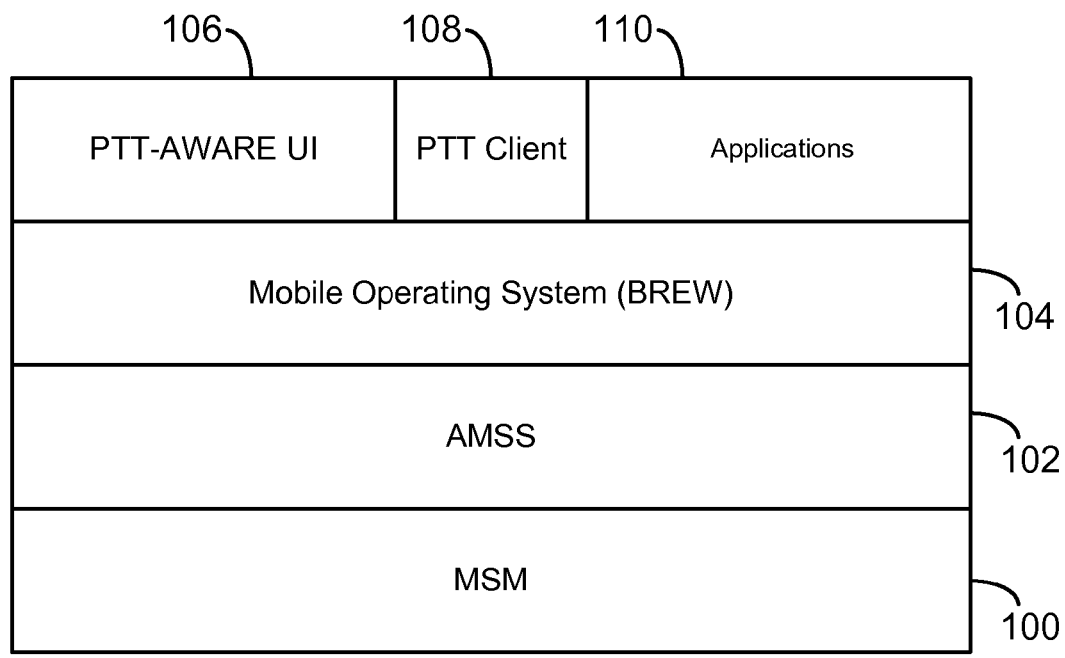
FIG. 4 is a block diagram illustrating the software layers resident on a computing platform of a wireless mobile device.

FIG. 4 is a diagram of one embodiment of the software layers resident on the computer platform 82 of the wireless communication device 74, with a PTT facility and a group-directed communication facility. In this embodiment, the computer platform 82 in the mobile device environment includes series of software "layers" developed on top of the Mobile Station Modem (MSM) 100 and the Advanced Mobile Subscriber Software (AMSS) 102, developed by QUALCOMM®, drives the underlying MSM chipset and implements the software protocol stack for the entire suite of CDMA communication technologies that include CDMA2000 1X and CDMA2000 1xEV-DO. There is a mobile operating system layer 104, which in this embodiment is BREW®, also developed by QUALCOMM. The mobile operating system layer 104 application programming interfaces for chip- or device-specific operations, while providing an isolation layer that eliminates direct contact to the AMSS 100 and any OEM software on the computer platform. The mobile operating system layer 104 enables application development that uses mobile device features without having to rewrite the application each time a new release of the device-specific software is released.

The PTT Client 108 is an application that offers access to PTT services through an external interface, here shown at a PTT-aware UI 106. The PTT Client includes all the functions required to enable mobile operating system 104 applications, such as the other resident applications 110. In addition to providing access to PTT services with the PTT Client 108, the PTT Client 108 can act as an isolation layer between all PTT-aware applications and the interface to the group communication computer device 102. In this embodiment, the PTT Client 108 maintains access to PTT services, responds to group communication requests, processes all PTT-aware mobile operating system applications requests for PTT services, processes all outgoing PTT requests, collects and packages vocoder packets for originating PTT talk spurts, and parses packets of vocoder data for terminated PTT talk spurts.

In one embodiment, a handler will provide direct access to the external communication interface, or here, an AMSS 102 interface. The media handler responds to PTT requests for group-directed services by invoking the appropriate APIs, such as those from other resident applications 110, and can service the requests from the user and informs the user the result of any group-directed media request. The handler can be invoked to have the AMSS 102 interface brought to an active state and ready to broadcast on the network, as is more fully described herein. Thus, the AMSS 102 or other communication interface typically has a dormant state and active state such that resources are only requested from the wireless communication network in the active state of the communication interface, e.g. the device components are powered-up and ready to transmit.

In one embodiment, PTT Client 108 may interface with a prioritization application stored as a resident application 110. When an alert is received by PTT Client 108, PTT Client 108 communicates with the prioritization application. The prioritization application will access a prioritization list, such as the prioritization list stored in memory 88 of FIG. 3, and determine if the incoming alert is to receive priority over a current communication being handled by PTT Client 108. If the incoming alert does have priority, PTT Client 108 drops the current call and causes the mobile device to transmit a ready signal to receive the incoming priority communication. Thus, PTT Client 108 will change the state of the device from unavailable to available.

Figure 5:
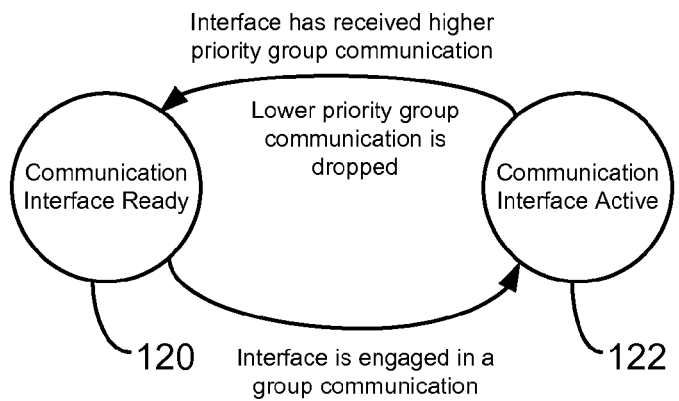
FIG. 5 is a state diagram of the group communication interface of the wireless communication device in accordance with an embodiment of the invention.

FIG. 5 is a state diagram of the communication interface 92 of the wireless communication device in accordance with an embodiment of the invention. Referring to FIG. 5, the communication interface 92 is in a ready state 120 where the communication interface 92 can join an incoming group communication session, such as a PTT communication. When a first group communication session is established, the communication interface 92 transitions to an active state 122. As will be described below in more detail with respect to FIG. 6, when in the active state 122, upon receiving an announcement of a new group communication session, the wireless communication device 14 determines whether its current communication session has a higher priority level than the announced communication session. If the wireless communication device 14 determines that the announced communication session does not have a higher priority than its current communication session, the communication interface 92 returns signal indicating the wireless communication device 14 is "unavailable" to an inquiring group communications server 32. Alternatively, if the wireless communication device 14 determines that the announced communication session has a higher priority than its current communication session, the communication interface 92 drops its current communication session and transitions back to the ready state 120, such that the announced group communication can be joined, after which the communication interface 92 will again transition to the active state 122 for the new session.

While FIG. 5 is described above with respect to transitioning the communication device 14 from an active state during which the device 14 is engaged in a current group communication session to a ready-state that permits the device 14 to join an announced group communication session, it will be appreciated that other embodiments can be directed to a transition from any type of processing task or activity to the ready state. In other words, in at least one embodiment, an alert such as a group call announcement can force the device 14 to exit any processing task to facilitate the device 14 to join an announced group communication session. The processing task may correspond to a gaming session, a web browsing session, a one-to-one voice call or a group communication session. While embodiments described below are generally directed to forcing the device 14 to selectively exit out of or drop a current group communication session in favor of a newly announced group communication session, it will thereby be appreciated that these embodiments could also be modified to scenarios where the device 14 is currently engaged in other types of processing tasks.

In an example, the incoming group communication can be an announcement or alert that is specially configured to cause the state of the wireless communication device 14 to change to the ready state 120, i.e. to drop an ongoing group communication or to change a function of the device, but not necessarily to cause a second group communication to be received immediately thereafter. Thus, the alert is not necessarily directly associated with a new session, but could rather function as an instruction to transition from state 122 to state 120.

Figure 6:
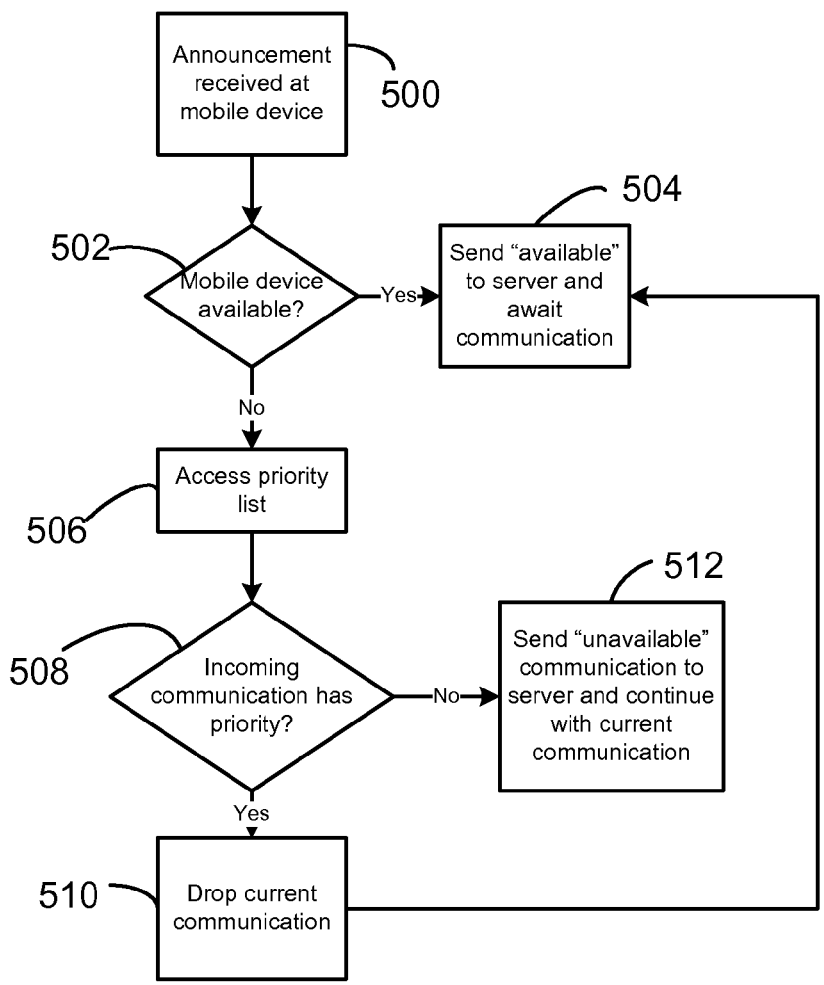
FIG. 6 illustrates a process by which a wireless communication device can selectively determine to drop a current communication session when an announcement of a different communication session is received based on associated priority levels in accordance with an embodiment of the invention.

FIG. 6 illustrates a process by which a wireless communication device can selectively determine to drop a current communication session when an announcement of a different communication session is received based on associated priority levels in accordance with an embodiment of the invention.

Referring to FIG. 6, the wireless communication device 14 receives, 500, an announcement of a group communication session (e.g., a PTT session). Upon receiving the call announcement, the wireless communication device 14 determines whether it is currently available, such that the call announcement can be accepted, 502. For example, the determination of 502 may evaluate to "available" if the wireless communication device 14 is in ready state 120 when the call announcement is received at 500, or alternatively may evaluate to "unavailable" if the wireless communication device 14 is in active state 122 when the call announcement is received at 500. If the decision block 502 determines that the wireless communication device 502 is available to join a communication session, the wireless communication device 14 sends an indication that indicates the availability of the wireless communication device 14 and its willingness to join the announced communication session. For example, the message sent in 504 may correspond to an announce ACK (accept) message that is sent to a serving base station and then forwarded onto the group communications server 32 that is arbitrating the announced communication session.

Otherwise, if the decision block 502 determines the wireless communication device 14 to currently be unavailable (e.g., because the device 14 is already engaged in another session, the communication interface 92 of the device 14 is in active state 14, etc.), the wireless communication device 14 accesses the priority list stored thereon, 506, and determines whether the newly announced communication session from 500 has a higher priority than a current communication session at the device 14, 508. Again, the priority level determination can be performed in a number of ways. For example, the group identifier that identifies the group associated with the announced group communication session and/or the current group communication session can be used to establish their respective priority levels. In an alternative example, a calling party identifier of an originator of the announced group communication session can be used to establish the priority level for the announced group communication session. In another example, a calling party identifier of a current floor-holder of the device's 14 current group communication session can be used to establish the priority level for the device's 14 current group communication session. The priority levels may be denoted quantitatively (e.g., with a ranking between 0 and 7 indicated by a table in the priority list, etc.) or hierarchically (e.g., relative priority levels can be stored in the priority list). For example, the message sent in 512 may correspond to an announce ACK (reject) message that is sent to a serving base station and then forwarded onto the group communications server 32 that is arbitrating the announced communication session. In an example, if the current and announced group communication sessions are determined to have the same priority, the device 14 can either maintain the current group communication session, or switch to the new group communication session in such instances. In an example, selecting between equal-priority sessions can be based on a preference of the user and can be stored in association with the priority list (e.g., "Switch to new session if priority levels are equal" or "Maintain current session if priority levels are equal", etc.).

Based on the priority level comparison in 508, the wireless communication device 14 determines, 508, whether to switch from its current group communication session to the newly announced group communication session from 500. Accordingly, if the wireless communication device 14 determines not to switch to the newly announced group communication session based on the associated priority levels, the wireless communication device 14 sends a signal indicating that the wireless communication device 14 is unavailable, 512. Otherwise, if the wireless communication device 14 determines to switch to the newly announced group communication session based on the associated priority levels, the wireless communication device 14 drops its current communication session, 510. Accordingly, in 510, the wireless communication device 14 transitions from the active state 122 to the ready state 120. As such, the process advances to 504 at this point, and the wireless communication device 14 indicates its availability and willingness to join the announced group communication session, as discussed above (e.g., an announce ACK (accept) message is sent to the server 32). While FIG. 6 is described and shown such that the current communication is dropped, 510, before the device 14 accepts the new session, 504, it will be appreciated that 504 may occur prior to 510 in another embodiment of the invention. Thus, the particular order of operations illustrated in FIG. 6, at least with respect to 510 and 504, is not intended to limit the embodiments thereto.

As will be appreciated by one of ordinary skill in the art, permitting the wireless communication device 14 to handle its own priority levels reduces the complexities associated with individual priority enforcement for multiple users at the server 32. Also, individual users are permitted more flexibility in terms of establishing call priorities so that important calls are not ignored when the users are already engaged in a call.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of switching from a first server-arbitrated group communication session to a second server-arbitrated group communication session at a given access terminal within a wireless communications system, comprising:
   receiving an announce message at the given access terminal that announces the second group communication session when the given access terminal is participating in the first group communication session;
   acquiring one or more priority levels associated with one or more of the first and second group communication sessions;
   determining, by the given access terminal, whether to switch from the first group communication session to the second group communication session based on the one or more priority levels; and
   selectively switching from the first group communication session to the second group communication session based on the determining.

2. The method of claim 1, wherein the determining includes determining to switch from the first group communication session to the second group communication session if a priority level for the second group communication session is higher than a priority level for the first group communication session.

3. The method of claim 1, wherein the selectively switching includes, if the determining determines to switch from the first group communication session to the second group communication session, dropping the first group communication session and sending a signal that indicates that the given access terminal accepts the announce message for the second group communication session.

4. The method of claim 3, wherein the dropping is performed prior to the sending.

5. The method of claim 3, wherein the sending is performed prior to the dropping.

6. The method of claim 1, wherein the selectively switching includes, if the determining determines not to switch from the first group communication session to the second group communication session, maintaining the first group communication session and sending a signal that indicates that the given access terminal does not accept the announce message for the second group communication session.

7. The method of claim 1, wherein the acquiring acquires the one or more priority levels based on a priority list stored in memory at the given access terminal.

8. The method of claim 7, wherein the priority list is established at the given access terminal.

9. The method of claim 7, wherein the priority list is established remotely from the given access terminal and communicated thereto.

10. The method of claim 7, wherein the priority list stores priority levels that are each specific to an associated communication type of group communication session.

11. The method of claim 10, wherein the associated communication type corresponds to one or more of voice data, applications, graphic media, and/or audio files.

12. The method of claim 1, wherein the first group communication session and/or the second group communication correspond to a push-to-talk (PTT) session, a push-to-transfer (PTX) session, a half-duplex communication session or a full-duplex communication session.

13. An access terminal configured to selectively switch from a first server-arbitrated group communication session to a second server-arbitrated group communication session within a wireless communications system, comprising:
   means for receiving an announce message that announces the second group communication session when the access terminal is participating in the first group communication session;
   means for acquiring one or more priority levels associated with one or more of the first and second group communication sessions;
   means for determining, by the access terminal, whether to switch from the first group communication session to the second group communication session based on the one or more priority levels; and
   means for selectively switching from the first group communication session to the second group communication session based on the determination of the means for determining.

14. An access terminal configured to selectively switch from a first server-arbitrated group communication session to a second server-arbitrated group communication session within a wireless communications system, comprising:
   logic configured to receive an announce message that announces the second group communication session when the access terminal is participating in the first group communication session;
   logic configured to acquire one or more priority levels associated with one or more of the first and second group communication sessions;
   logic configured to determine, by the access terminal, whether to switch from the first group communication session to the second group communication session based on the one or more priority levels; and logic configured to selectively switch from the first group communication session to the second group communication session based on the determination of the logic configured to determine.

15. The access terminal of claim 14, wherein the determining logic determines to switch from the first group communication session to the second group communication session if a priority level for the second group communication session is higher than a priority level for the first group communication session.

16. The access terminal of claim 14, wherein the selectively switching logic is configured to, if the determining logic determines to switch from the first group communication session to the second group communication session, drop the first group communication session and send a signal that indicates that the access terminal accepts the announce message for the second group communication session.

17. The access terminal of claim 16, wherein the selectively switching logic drops the first group communication session prior to sending the signal.

18. The access terminal of claim 16, wherein the selectively switching logic sends the signal prior to dropping the first communication session.

19. The access terminal of claim 14, wherein the selectively switching logic is configured to, if the determining logic determines not to switch from the first group communication session to the second group communication session, maintain the first group communication session and send a signal that indicates that the access terminal does not accept the announce message for the second group communication session.

20. The access terminal of claim 14, wherein the acquiring logic acquires the one or more priority levels based on a priority list stored in memory at the access terminal.

21. The access terminal of claim 20, wherein the priority list is established at the access terminal.

22. The access terminal of claim 20, wherein the priority list is established remotely from the access terminal and communicated thereto.

23. The access terminal of claim 20, wherein the priority list stores priority levels that are each specific to an associated communication type of group communication session.

24. The access terminal of claim 23, wherein the associated communication type corresponds to one or more of voice data, applications, graphic media, and/or audio files.

25. The access terminal of claim 14, wherein the first group communication session and/or the second group communication session correspond to a push-to-talk (PTT) session, a push-to-transfer (PTX) session, a half-duplex communication session or a full-duplex communication session.

26. A non-transitory computer-readable storage medium comprising instructions, which, when executed by an access terminal configured to selectively switch from a first server-arbitrated group communication session to a second server-arbitrated group communication session within a wireless communications system, cause the access terminal to perform operations, the instructions comprising:
    program code to receive an announce message that announces the second group communication session when the access terminal is participating in the first group communication session;
    program code to acquire one or more priority levels associated with one or more of the first and second group communication sessions;
    program code to determine, by the access terminal, whether to switch from the first group communication session to the second group communication session based on the one or more priority levels; and
    program code to selectively switch from the first group communication session to the second group communication session based on the determination of the program code to determine.

* * * * *